United States Patent
Pinschmidt, Jr. et al.

(10) Patent No.: US 6,391,992 B1
(45) Date of Patent: *May 21, 2002

(54) SULFONATE-TERMINATED OLIGOMERS OF VINYL ESTERS AND THEIR VINYL ALCOHOL OLIGOMER DERIVATIVES

(75) Inventors: Robert Krantz Pinschmidt, Jr.; Khalil Yacoub, both of Allentown, PA (US)

(73) Assignee: Celanese International Corporation, Dallas, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/157,231

(22) Filed: Sep. 18, 1998

(51) Int. Cl.$^7$ .............................................. C08F 130/04
(52) U.S. Cl. ..................... 526/240; 526/222; 526/271; 526/286; 526/287; 526/295; 526/310; 526/317.1; 526/319; 526/330
(58) Field of Search ................................. 526/222, 240, 526/271, 295, 319, 286, 287, 317.1, 310, 330

(56) References Cited

U.S. PATENT DOCUMENTS

| | | | | |
|---|---|---|---|---|
| 3,646,099 | A | | 2/1972 | Dannals ................... 260/465.4 |
| 4,319,014 | A | * | 3/1982 | Peascoe et al. ............. 526/287 |
| 4,360,632 | A | | 11/1982 | Pinschmidt et al. ........ 524/819 |
| 4,522,999 | A | * | 6/1985 | Heimberg .................... 526/309 |
| 4,711,725 | A | * | 12/1987 | Amick et al. ................ 210/701 |
| 5,247,040 | A | * | 9/1993 | Amick et al. ................ 526/286 |
| 5,326,808 | A | * | 7/1994 | Floyd et al. ................. 524/457 |
| 5,380,782 | A | * | 1/1995 | Bogan, Jr. ................... 524/404 |
| 5,470,906 | A | * | 11/1995 | Craun et al. ................ 524/507 |
| 5,773,541 | A | * | 6/1998 | Boeckh et al. .............. 526/209 |

FOREIGN PATENT DOCUMENTS

GB 1026947 * 4/1966

OTHER PUBLICATIONS

Moritani, T., et al, "Functional Modification of Poly(vinyl alcohol) by Copolymerization: 1. Modification with Carboxylic Monomers", *Polymer*, vol. 38, No. 12, p. 2933 (1997).

Mukherjee, A. R., et al, "Bisulfite–Initiated Vinyl Polymerization in Aqueous Media", *Makromolekulare Chemie, 80*, p. 208 (1964).

Schmitt, K. D., "Surfactant–Mediated Phase Transfer as an Alternative to Propanesultone Alkylation. Formation of a New Class of Zwitterionic Surfactants", *J. Org. Chem., 60*, p. 5474 (1995).

Ghosh, P., et al, "Endgroup Studies in Persulfate–Initiated Vinyl Polymer by Dye Techniques. Part I. Initiation by Persulfate Alone", *J. Polymer Science: Part A*, vol. 2, pp. 4433–4440 (1964).

Hergeth, W. D., et al, "Particle Formation in Emulsion Polymerization, 1; Oligomers in Emulsion Polymerization of Vinyl Acetate", *Makromol. Chem., 192*, pp. 2265–2275 (1991).

Moustafa, A. B., et al, "Some Parameters Affecting the Emulsifier–Free Emulsion Polymerization of Vinyl Acetate", *J. Appl. Poly. Sci.*, vol. 63, pp. 239–246 (1997).

* cited by examiner

*Primary Examiner*—Judy M. Reddick
(74) *Attorney, Agent, or Firm*—Mark L. Rodgers; Michael W. Ferrell; M. Susan Spiering

(57) ABSTRACT

Oligomers of vinyl esters, preferably of vinyl acetate, are provided in which the molecules contain a single terminal sulfonate group, thereby making these products useful as surface-active agents. These oligomers can be converted by hydrolysis to sulfonate-terminated vinyl alcohol oligomer which is also a surface-active agent. The number average molecular weight of the vinyl ester oligomer is not over 17,000 and not over 7,500 for the vinyl alcohol oligomer. These products are made by polymerizing the vinyl ester in the presence of a bisulfite chain transfer agent in water, preferably with a cosolvent such as methanol. The vinyl ester is delay fed to the polymerization, molecular weight is controlled with the bisulfite, and the system is maintained in a virtual single phase with any organic phase present swollen with water or water and cosolvent.

7 Claims, No Drawings

SULFONATE-TERMINATED OLIGOMERS OF VINYL ESTERS AND THEIR VINYL ALCOHOL OLIGOMER DERIVATIVES

BACKGROUND OF THE INVENTION

This invention relates to vinyl ester oligomers which carry a terminal sulfonate group and their hydroxyl containing derivatives. In another aspect it relates to a process for making such polymers. In still another aspect it relates to a method of using bisulfite chain transfer agents in the polymerization of vinyl esters in order to form low molecular weight, sulfonate-terminated oligomers that can be used as is or converted to oligomers containing vinyl alcohol groups and having a terminal sulfonate group.

It has become increasingly difficult to find suitable surfactants and surface-active agents to meet the vast variety of needs found in industry today. These materials are required in products such as soaps, detergents, emulsifiers, dispersion and suspension stabilizers, paper coatings, inks, pigment dispersants and grinding aids, papermaking additives, flocculents, and the like. Each of these uses has special requirements to satisfy its particular application. It would be highly desirable to be able to meet these needs by preparing low molecular weight polymers or oligomers from available monomers that polymerize readily in aqueous systems with free radical initiation. In such systems, however, molecular weight control is a problem because the polymer molecules tend to grow too large to be useful, for instance, as a surfactant. Although molecular weight can be kept lower by the use of chain transfer agents, there remains the problem of including within the polymer both the polar and nonpolar components that are required in surface-active materials. This is especially true in view of the economic constraints that limit the chemistry and number of process steps required for making a suitable product.

Poly(vinyl acetate) and its hydrolyzed derivative, poly(vinyl alcohol), are two well known polymers that are available commercially in quantity, but it has been difficult to modify these materials to include acidic groups desirable for surfactant properties. The most common route attempted to date is through copolymerization of vinyl acetate with monomers containing acidic functionality. For example, in "Functional Modification of Poly(vinyl alcohol) by Copolymerization: 1. Modification with Carboxylic Monomers." *Polymer*, Vol. 38, No. 12, p.2933, (1997), Moritani and Kajitani suggest that multifunctional polymers useful as sizing in the paper and textile industries can be made by copolymerizing vinyl acetate and carboxyl-containing monomers and then hydrolyzing the acetate groups to alcohol as in the manufacture of poly(vinyl alcohol). The initiator used was AIBN. The copolymerization route to incorporate acidic groups in these polymers results in random distribution of the acidic groups along the polymer chain rather than in a terminal position in the molecule where acidic functionality would be more effective in enabling the polymer to serve as a surfactant.

Another way of incorporating acidic groups into a low molecular weight polymer molecule is described in U.S. Pat. No. 3,646,099, Dannals, (1972). This patent discloses making oligomers containing sodium sulfonate-terminated polymers by polymerizing a hydrophilic monomer, such as acrylic acid, by reductive polymerization using a relatively high proportion of sodium bisulfite as the reducing chemical. The monomer containing the hydrophilic group can be copolymerized with limited amounts of comonomer containing a hydrophobic group provided that the proportion of the hydrophobic comonomer does not exceed 60 mol percent and is preferably less than 30 mol percent of the polymerized monomeric units. The utility suggested for these polymers is as conductive agents. Although vinyl acetate is listed among a large group of suggested monomers containing hydrophobic groups, it is clear from the context of this disclosure that such monomers are to be used only as a minor comonomer, if at all. This is understandable since it has been found that vinyl acetate tends to react with bisulfite to form 1:1 adducts rather that polymerized products. For example, Mukherjee, et al. in "Bisulfite-Initiated Vinyl Polymerization in Aqueous Media", *Makromolekulare Chemie*, 80, p.208 (1964), investigated the use of bisulfites in the aqueous polymerization of certain vinyl monomers such as methyl methacrylate, ethyl methacrylate, methyl acrylate and styrene. These successful products were said to contain, on average, two sulfonate end groups per polymer chain. The reactions failed, however, in the case of vinyl acetate, acrylonitrile, methacrylate and acrylic acid. It was concluded that the reaction is monomer specific. Furthermore, standard industrial practice for preparing poly(vinyl alcohol) requires polymerization of vinyl acetate in methanol solvent, in which bisulfite is insoluble. Also, Schmitt, *J. Org. Chem.*, 60, p.5474 (1995), described reaction of bisulfite with allyl groups but obtained only mixtures of sulfonate and sulfite groups in 1:1 adducts.

On the other hand, U.S. Pat. No. 4,360,632, Pinschmidt et al. (1982) discloses that vinyl acetate high polymers can be made in emulsion polymerization using a ketone bisulfite as a formaldehyde-free reducing agent in the initiator system. The products are high molecular weight polymers useful in latex form in the manufacture of non-woven goods. Two runs in which sodium bisulfite was used instead of ketone bisulfite are disclosed as control runs which gave poor results. It has remained, therefore, an unsolved problem of how one might incorporate sulfonate groups into oligomers of vinyl acetate and vinyl alcohol in such a way that these polymers are provided with enhanced surface active properties.

Two papers, P. Ghoshy, S. C. Chadha, A. R. Mukherjee, and S. R. Palit, *J. Polym. Sci.*, Pt. A, 2, 4433–4440 (1964) and W. D. Hergeth, W. Lebek, R. Kakuschke, K. Schmutzler, *Makromol. Chem.* 192, 2265–2275 (1991), describe highly impractical syntheses of anionically terminated polymers or oligomers using persulfate and vinyl acetate by operating at very low monomer concentration (1% in the former, giving polymers of 475,000 Mn and, in the latter, a very dilute delay feed summing to 0.05 to 0.8% polymerized vinyl acetate on water at the end of the reaction to give 3000 Mn oligomer). In both papers, the authors describe the products as made by termination (instead of transfer as in our process) and, although the latter believe their chains contain one sulfate end group, the former authors measure 1.3 to 1.8 sulfate endgroups per chain. The sulfate endgroups are described by Ghoshy, et al. as hydrolytically unstable (p.4434) relative to sulfonate endgroups and would not survive hydrolysis to prepare a vinyl alcohol oligomer. The surfactant properties of the unhydrolyzed oligomer in the second article appear significantly different than what we have measured.

A. B. Moustafa, A. A. Abd El Hakim, G. A. Mohamed, *J. Appl. Poly. Sci.* 63, 239–246 (1997) reported emulsion polymerization of vinyl acetate at low solids (only 10% VAc on water) using a 1:1 molar ratio of persulfate and bisulfite without surfactant or cosolvent. They obtained poor conversions with 2.8 wt % persulfate on monomer, but could exceed 90% conversion with an exceedingly high 5.6 wt % persulfate on monomer. Their product was a stable, presumably high molecular weight emulsion polymer, rather than a dispersible oligomer.

BRIEF SUMMARY OF THE INVENTION

According to our invention, a product is provided which is an oligomer of a vinyl ester of an organic acid having 2 to 18 carbon atoms, the molecules of the oligomer being terminated at one end by a sulfonate group. Our invention also provides a vinyl alcohol oligomer having a terminal sulfonate group. Such an oligomer is a derivative of a vinyl ester oligomer in which at least a portion of the ester moieties of the vinyl ester have been hydrolyzed to hydroxy groups. Our invention also provides a vinyl acetate or vinyl alcohol cooligomer with acid or quaternary amine containing monomers and having a terminal sulfonate group. These oligomers are unique in having one strong acid anion at one end of the molecule and adjustable levels of weak or strong acid anions or permanent cations along the chain. We have found that vinyl esters, especially vinyl acetate, can be polymerized in aqueous and partly aqueous media using a bisulfite chain transfer agent to form these useful oligomers containing terminal sulfonate groups, provided certain process procedures are followed.

In the process of our invention, a polymerization mixture is formed containing water, preferably with a cosolvent such as methanol, the vinyl ester, the bisulfite, preferably sodium or ammonium bisulfite, and a free radical initiator, preferably an oxidant which can serve as a component of a redox initiator. This mixture can be formed without the addition of an emulsifying agent as is normally the practice in preparing systems for emulsion polymerization. Although emulsifiers can be added, it is preferred that they not be used. As the product of the process is formed, the sulfonate-terminated oligomer, if sufficiently low in molecular weight, remains largely water soluble and acts as a compatibilizer in the system. If higher molecular weight poorly water soluble oligomer is desired, a cosolvent is used to aid in maintaining a one phase or effectively one phase mixture, in which both bisulfite and monomer are sufficiently soluble or miscible. In these ways it is possible to avoid the formation of partitioning micelles and phase separated hydrophobic particles which are typical of emulsion or dispersion polymerizations.

This mixture is subjected to polymerization conditions of temperature and agitation for a period of time during which vinyl ester is fed to the mixture at a rate such that a vinyl ester rich/bisulfite poor phase is not formed. In all aqueous or low cosolvent systems, this involves 'starve feeding' the vinyl ester at a rate such that the concentration of the vinyl ester in the mixture does not go over 3 weight percent. Also during this period the level of the bisulfite chain transfer agent in the mixture is controlled so that the average degree of polymerization (DP) of the product oligomer containing a single sulfonate end group per chain does not exceed a DP of 200 (number average molecular weight of 17,280 for vinyl acetate). This product is either recovered from the mixture or the mixture is converted to a condition suitable for hydrolysis of the oligomer to form the sulfonate-terminated vinyl alcohol oligomer product. For the production of the hydrolyzed oligomer, the bisulfite level should be such that the average degree of polymerization of the end product does not exceed 200.

DETAILED DESCRIPTION OF THE INVENTION

According to our invention, vinyl esters of organic acids having 2 to 18 carbon atoms are polymerized in the presence of a bisulfite as a chain transfer agent in a virtual single-phase system. The bisulfite can also serve as the reductant along with an oxidant in a redox initiator used in the polymerization which is carried out in the presence of water, ideally with a cosolvent such as an alcohol, preferably methanol.

The polymerization is carried out in a virtual single phase which effectively maintains the proper ratios of vinyl ester to bisulfite in the reaction. This single phase system is maintained through the delay addition of monomer, by controlling the bisulfite level so that the oligomer or polymer formed is relatively low in molecular weight, and through the judicious use of appropriate solvents and solvent mixtures, preferably with no external surfactant added to the polymerization mixture. In this way micelles that tend to partition the polymerizing hydrophobic monomer from the water-soluble bisulfite are not formed, or at least are minimized in the reaction mixture. To further minimize partitioning of vinyl acetate and bisulfite into separate phases, the vinyl ester and comonomer, if any, are fed to the system in a continuous, or intermittent or semi-continuous manner which maintains a controlled proportion of bisulfite in relation to the vinyl ester. The feeding of the monomer is controlled so that during the polymerization the monomer does not significantly phase separate from a bisulfite containing phase into a bisulfite depleted organic phase. It is preferred to use vinyl esters of organic acids having 2 to 12 carbon atoms and particularly the vinyl esters of acetic, propionic and tert-butyric acids. As the polymerization progresses, the product sulfonate-terminated oligomer begins to function as a hydrophilic cosolvent in the system and can create an organic phase which is swollen with water, bisulfite, and any cosolvent that is present. Although this phenomenon may appear as converting the polymerization system from single phase to two phase, such is not actually the case in the sense normally understood for two phase, micelle partitioned emulsion (dispersion) polymerization. Any organic phase which forms due to the production of sulfonate-terminated oligomer serving as a compatibilizer does not exclude the bisulfite from the monomer because such organic phase is sufficiently swollen with water or water and cosolvent that the water-soluble bisulfite is available to the monomer in effective concentrations. Likewise, cosolvent and dissolved oligomer in any water rich phase prevent excessive depletion of vinyl ester monomer from that phase. This is unlike the situation that exists in a typical emulsion system where most of the vinyl ester is present in a salt depleted hydrophobic phase and is converted to high polymer.

The oligomers prepared by the process of the invention include a fairly broad range of molecular weights and can be characterized as low, medium and high molecular weight oligomers, all of which, however, find utility in various applications as surface-active agents. By "oligomers" as used in defining this invention, therefore, we mean polymerized species which are not mere adducts of a monomer and a sulfonate radical, but are polymers having an average of from two to less than 200 monomer units (DP<200) and which can have, for vinyl acetate, number average molecular weights (Mn) as high as about 17,000. These oligomers preferably range from dimers and trimers to oligomers having a $M_n$ below 15,000 for the oligomers of vinyl esters and below 7,500 for the vinyl alcohol oligomers (calculated on fully hydrolyzed PVOH). Even more preferably the $M_n$ for the oligomers of vinyl esters lie in the range of 350 to 8000, and for the oligomers of vinyl alcohol in the range of 175 to 6000. Oligomer molecular weights determine solubility properties of the products, with unhydrolyzed oligomers having a $M_n$ up to about 2000 showing water miscibility before hydrolysis and higher molecular weight oligomers showing water dispersibility and ready alcohol miscibility or solubility.

Molecular weight of the oligomer can be controlled by adjusting the bisulfite to monomer ratio and also by using chain transfer cosolvents, such as tetrahydrofuran or isopropanol. Control of molecular weight can be assisted through the adjustment of the levels of one or more of the vinyl ester, initiator, or cosolvent in the polymerization mixture, and also by changing the temperature. In general, increasing the monomer level will increase molecular weight while increasing initiator level, cosolvent level or temperature will decrease the molecular weight of the product.

The vinyl esters can be copolymerized with up to 30 mol percent of various comonomers of the type that are conventionally copolymerized with vinyl acetate. For example, suitable comonomers include other vinyl esters suitable for homopolymerization, especially esters of the $C_{11}$ to $C_{16}$ neoacids; sodium vinylsulfonate (SVS); diallyldimethylammonium chloride; maleic anhydride; acidic monomers such as acrylic, crotonic, acrylamidopropanesulfonic (AMPS), itaconic, methacrylic, maleic or fumaric acid, neutralized, for example with ammonia or an alkali metal hydroxide to a pH of 3 to 5; acrylamide and substituted acrylamides such as N-methylolacrylamide; vinyl chloride; ethylene; maleate or fumarate esters or neutralized half esters; amides or half-amides; amideesters; acrylic or methacrylic esters of $C_1$ to $C_{18}$ alcohols; functional (meth)acrylates such as hydroxyethyl and diethylaminoethyl acrylate; acrylonitrile; allyl esters; N-vinylamides such as N-vinylpyrrolidone, N-vinylformamide, and N-vinylacetamide; and the like. If comonomers are used, it is preferred that their proportion with relation to the principal monomer fall within the molar ratios of 1:20 to 1:9, comonomer to vinyl ester.

The bisulfite chain transfer agent can be any bisulfite compound which effects chain transfer in free radical initiated polymerization in aqueous media. Preferred bisulfites are ammonium or sodium bisulfites or metabisulfites since these compounds are readily available and easily handled. Also suitable, however, are other counterions such as alkaline earth salts and alkylammonium salts. Other sources of bisulfite can be used, such as sulfite salts converted to bisulfite by partial acidification; or sulfur dioxide dissolved in water and partially neutralized to bisulfite.

In preparing the oligomers of the invention, the amount of bisulfite chain transfer agent used in relation to the monomer polymerized depends upon the desired molecular weight of the oligomer. The molar ratio of vinyl ester to bisulfite should be at least 2 to 1 and can be as high as 50 or 60 to 1 or even higher. This ratio is a major variable in determining molecular weight of the oligomer, but pH of the system is also a consideration. The reaction proceeds best within a pH range of 3 to 7 where the bisulfite ions are not excessively converted by equilibrium to $H_2SO_3$ or sulfite. It is preferred to keep the pH of the system in the range of 4 to 6. Changes in the pH during the course of the reaction can also affect the sulfite/bisulfite ratio and are desirably controlled, for example by the use of a buffer. Sodium bicarbonate is quite effective for this purpose, but other systems known to be useful for buffering within the desired range can also be used. We have found that the pH values of 8.0 and above or below 3.0 are unfavorable for achieving low molecular weights for the oligomers, probably because the concentration of bisulfite becomes too low to sustain the required chain transfer function. In batch operations the bisulfite can be added either initially or continuously during the reaction.

Initiators used in the process of the invention can be any of the free radical polymerization initiators known in the art to be suitable for polymerizing radically polymerizable monomers. These include both thermally activated radical initiators and redox systems. Examples of suitable initiators include inorganic peroxidic materials, such as potassium, ammonium or sodium persulfate; hydrogen peroxide; azo compounds such as azo-bis-isobutyronitrile; organic peroxides such as peracids, for example peracetic acid, peranhydrides such as benzoyl peroxide, peresters such as t-butyl perneodecanoate, t-butyl hydroperoxide, and oxygen itself. Redox systems include hose based on a combination of an oxidizing agent, a reducing agent and a trace amount of an appropriate transition metal. Metal ions such as iron, copper, nickel, or chromium, and, most preferably, iron (II) or iron (III) salts plus an oxidizing agent such as hydrogen peroxide, t-butyl hydroperoxide, or $K_2S_2O_8$ are also suitable choices. Since bisulfite is a reducing agent, addition of an additional reducing agent to form a redox system would be redundant but optional. Persulfate is the preferred initiator. The initiator, especially one operating as a part of redox system, is preferably added to the polymerization mixture continuously at a level effective to control monomer conversion rate. Suitable amounts are 0.01 to 5 weight percent of the monomer used, and preferably the initiator is added in an amount corresponding to 0.1 to 1.5 weight percent of the monomer.

The solvent system selected for the telomerization of the vinyl ester must be one in which both the vinyl ester and the bisulfite compound are at least somewhat soluble. Water or water/alcohol mixtures are preferred. Alcohols such as methanol, ethanol, 1-propanol or water miscible solvents or cosolvents such as acetonitrile or tetrahydrofuran are also suitable choices. The most desirable solvent is water alone or with methanol added. The system is operable in a predominantly alcohol media but there must be sufficient water present to dissolve the bisulfite. Preferably the volume ratio of water to methanol is in the range of 0.2/1 to 10/1. Generally the use of water alone or with up to 5 volume percent methanol is suitable for producing very low molecular weight oligomers, for example, oligomers with a number average molecular weight (Mn) of less then 1200. The use of higher proportions of methanol, in general, is needed for oligomers of higher molecular weight; within narrow ranges, increasing the methanol level can lower the molecular weight of the oligomer, other conditions being equal.

Although the starting reaction mixture is in a single phase, there is a tendency for more organic rich phase to develop due to limited miscibility of the product oligomer. This can be offset by using higher levels of alcohol or other organic cosolvent to maintain a single-phase mixture as the ratio of hydrophobe (e.g., vinyl acetate) to hydrophile (e.g. the bisulfite ion) is increased. Final oligomer to solvent ratios can vary from less than 10 weight percent to 50 percent and higher, with the higher ratios preferred for economic reasons and the lower ratios for obtaining very low molecular weights. Oligomer levels of 30 to 55 weight percent are preferred. Maintaining a single phase in the polymerization mixture has the further advantage of producing oligomers with narrower polydispersities. At the end of the reaction, however, conversion of the mixture into a two-phase system, for instance by cooling, simplifies separation of the oligomer from the solvent.

The temperature of the reaction can vary over a broad range but is generally in the range of about 20° C. to 100° C. Preferred temperatures for ease of operation are 25 to 75° C. and most preferably about 60 to 70 0C. Temperatures outside these ranges are operable. The reaction time is usually about 1 to 10 hours for batch reactions and in continuous operations the reactor turnover times are in the range of 1 to 10 hours also.

The process of our invention is able to make sulfonate-terminated oligomers of vinyl esters rather than high molecular weight polymers in which the effect of any terminal sulfonate groups would be lost. While not to be bound by theory, we believe that the reason for this is that the operative ratios of bisulfite to the monomer in the rapidly polymerizing phase(s) are kept higher in the process of the invention than the ratios found in other polymerization processes. This is accomplished by starve feeding monomer to the system and controlling the phase condition of the polymerization mixture throughout the reaction. This condition is defined for the purpose of our invention as a "virtual single phase". This term includes both an actual single phase and a pseudo two-phase system in which any organic phase that appears to separate from the solvent phase is sufficiently swollen with water or water and cosolvent that the bisulfite is soluble in the organic phase. There is thereby little or no partitioning effect that would otherwise tend to separate the monomer and bisulfite. At the start of the reaction both the monomer and the sulfite ion are soluble in the solvent, be it water or a water/alcohol mixture. This mutual solubility continues in the solvent-swollen organic phase as the oligomer chains grow. Vinyl acetate in particular possesses an attractive combination of water solubility, polymer hydrophilicity, monomer reaction rate with bisulfite, and rate of self polymerization to facilitate the successful synthesis of the oligomers of the invention.

It is clear that the relative solubility of monomer and bisulfite in the process of the invention is quite unlike prior art vinyl acetate emulsion polymerization conditions in which there are higher vinyl acetate levels, no cosolvent and lower or no bisulfite proportions. In such systems short growing polymer chains partition into an organic phase either by adsorption into a preformed hydrophobic particle or by formation of a micelle. When this happens the bisulfite ions that are preferentially soluble in the aqueous phase tend to be excluded from the organic-phase where the polymer is continuing to grow in a monomer rich, bisulfite depleted condition. Such a condition produces high molecular weight polymer. Eventual chain transfer generates new non-sulfonate terminated chains that also grow to high molecular weights. The poor solubility of these hydrophobic chains in water essentially suppresses their back migration into the aqueous phase where they could be terminated by bisulfite to reinitiate a telomerization reaction. The hydrophobic chains likewise swell or dissolve in monomer in the hydrophobic phase, reducing monomer concentration in the bisulfite rich aqueous phase and suppressing bisulfite concentrations in the monomer phase.

The sulfonate-terminated vinyl alcohol oligomer products of the invention are made by hydrolysis of the sulfonate-terminated poly(vinyl esters). The hydrolysis can be partial if desired, or hydrolysis can be essentially complete under suitable conditions. If the vinyl alcohol oligomer product is the objective from the beginning, it is logical to work with the oligomers of vinyl acetate. No advantage is to be gained by using the vinyl esters of higher acids because the acidic moiety of the ester is removed on hydrolysis of the polymer. Vinyl acetate is the most readily available vinyl ester in addition to being the easiest of the monomers to work with. Comonomers can be used, however, since these introduce functionality into the oligomer structure that is not destroyed on hydrolysis. Hydrolysis of poly(vinyl acetate) to form poly(vinyl alcohol) is a process well known in the art and conventional conditions can be employed in this aspect of our invention. The process is accomplished in an easily controlled process by mixing oligomer with methanol, optionally filtering to remove a small amount of solids, and adding acid or base as a hydrolysis catalyst. This provides a readily water-soluble, sulfonate-terminated vinyl alcohol oligomer of the desired molecular weight and hydrolysis level, depending upon the amount of catalyst used, the hydrolysis time, and the temperature. Usually the product is a solid. The products have good color with very rapid cold water solubility and give extremely low viscosity solutions.

Hydrolysis of the oligomer from the vinyl acetate telomerization is best accomplished in a high alcohol solution to increase rate and minimize coproduction of acetate ion (or acetic acid under acid conditions). This can be accomplished, for instance, by minimizing water in the initial reaction or by removal of most of the water of the polymerization mixture under reduced pressure. An excess of methanol, or optionally ethanol, is added to give a ratio of 5 to 80 weight percent and preferably 30 to 50 weight percent of the oligomer. Following this step an effective level of acid or base catalyst is added. Such catalysts are well known in the art of poly(vinyl alcohol) synthesis. Sodium or potassium hydroxide or methoxide are examples of base catalysts and hydrochloric, nitric, sulfuric and methanesulfonic acids are examples of acid catalysts. The effective amount of catalyst can vary from less than 0.1 mol percent to over 10 mol percent based on the oligomer. This amount depends upon the water left in the system, which can be over 25 percent, but is preferably less than 15, and most preferably less than 6 percent of the mixture, as well as on the time and temperature of the reaction. Usually the time is from one to 30 minutes in water free systems and 15 minutes to 8 hours in water containing alcohol media. The temperature can vary from less than 25 to over 100° C. Preferably the temperature is in the range of 35 to 70° C. These conditions will also depend upon the molecular weight of the oligomer and the desired level of hydrolysis. When an alcohol solvent is used, the product precipitates or phase separates as a white or off-white solid which can be isolated from the alcohol, coproduced acetate ester, and other salts. Hydrolysis levels can vary widely as desired for particular applications, depending upon the conditions and the size and type of oligomer. Hydrolysis levels can range from as low as about 10 percent to 100 percent. Other possible conversions include hydrolysis in water or high water/solvent mixtures by the addition of acid or base These methods can be attractive when hydrolysis byproducts do not detract from product performance or when lower levels of hydrolysis are desired.

Other variations, advantages and features of our invention will be apparent to those skilled in the art from the following Examples which are presented to be illustrative of the invention and should not be construed to limit it unduly.

EXAMPLE 1

This Example illustrates semi-continuous polymerization in which vinyl acetate is polymerized in the presence of bisulfite as a chain transfer agent.

A two-liter atmospheric kettle reactor equipped with a stirrer, nitrogen inlet, and sensors for measuring reaction temperature was charged with 150 ml of water and 50 ml of methanol. The water and organic reagents were deoxygenated by purging with nitrogen for 10 minutes prior to mixing them. The kettle was degassed with nitrogen and heated to 65° C. Vinyl acetate (500 ml, 5.4 mole) in 50 ml of methanol was delay fed to the reactor through a feed pump at a rate of 2.77 ml per minute. Sodium bisulfite (20 g, 00.19 mole) in 200 ml of water and 50 ml of methanol was delay fed through a feed pump at a rate of 1.7 ml per minute. Potassium persulfate and sodium bicarbonate buffer (4.0 g and 1.0 g) in 50 ml of water was delay fed through a feed pump at a rate of 0.7 ml per minute. The reaction mixture was stirred for 3 hours, during which time all reagents were added. The crude reaction product was an oligomer slurry with a pH of 4.5. Oligomers were collected as a grease-like paste of 48 weight percent solids to provide a 95 percent yield. The product was readily soluble in methanol and hazy in water and gave a solution that formed a foam when shaken. Gel permeation chromatography (GPC) analysis showed a weight average molecular weight ($M_w$) of 5210 g/mole, a number average molecular weight ($M_n$) of 1655 g/mole, and polydispersity (PD) of 3.14.

EXAMPLES 2–9

The procedure of Example I was repeated for Examples 2–9 except for the ratios of vinyl acetate (VAc) to bisulfite ($HSO_3$), the use of cosolvent, and the addition method for the bisulfite. These changes are as indicated in Table 1. Batch addition of the bisulfite involved simply pouring the solution into the reactor rather than delay addition. Also, 3 weight percent of lgepal 887 (nonylphenolpolyethoxylate) was added to the initial water charge as a surfactant in Example 6. In these Examples the reaction temperature was 60° C., the reaction time was 4.5 hours with the delay feeds occurring over this period, and the buffer was sodium bicarbonate with acetic acid to adjust the pH to 4–5.

The thus formed sulfonate-terminated oligomer products were concentrated under vacuum to remove water, redissolved in methanol, and filtered to remove unreacted bisulfite. Hydrolysis was carried out by adding sodium hydroxide as a catalyst (0.1–10 mole percent based on the oligomer) and heating the solution at 40° C. for 15 minutes. The final products were collected as white to slightly yellow fine powders and air dried at room temperature under reduced pressure. Analyses were made on the products by aqueous/nonaqueous GPC, matrix assisted laser desorption/ionization (MALD/I), and $^{13}C$ NMR to determine the molecular weight, product distribution, percentage of hydrolysis, and end group analysis. Results are given in Table 1.

TABLE 1

| Example | VAc:$HSO_3$ molar ratio | Molecular weight analysis | Solvent/cosolvent & Addition process |
|---|---|---|---|
| 2 | 1:1 | $^{13}C$ NMR Mainly 1:1 | Water/none Delay $HSO_3$ |
| 3 | 3.4:1 | $M_n$ = 360 $M_w$ = 696 PD = 1.9 | Water/none Delay $HSO_3$ |
| 4 | 6.7:1 | $M_n$ = 750 $M_w$ = 5,000 PD = 7 | Water/MeOH 10% Batch $HSO_3$ |
| 5 | 7.5:1 | $M_n$ = 2,000 $M_w$ = 23,000 PD = 11 | Water/none Batch $HSO_3$ |
| 6 | 7.5:1 | $M_n$ = 1,300 $M_w$ = 7,000 PD = 5 | Water/none Batch $HSO_3$ 3 wt % Igepal 887 |
| 7 | 11:1 | $M_n$ = 1,200 $M_w$ = 9,700 PD = 8 | Water/propanol 10% Delay $HSO_3$ |
| 8 | 30:1 | $M_n$ = 1,700 $M_w$ = 5,000 PD = 3.1 | Water/MeOH 16% Delay $HSO_3$ |
| 9 | 38:1 | $M_n$ = 2,500 $M_w$ = 14,000 PD = 5.6 | Water/MeOH 16% Delay $HSO_3$ |

As shown in Table 1, telomerization at high VAc:$HSO_3$ molar ratio increased the molecular weight of the final product (compare Examples 8 and 9). On the other hand, as the ration vinyl acetate to bisulfite is increased and the oligomers become less water soluble, addition of methanol or propanol decreased the number and weight average molecular weight and polydispersity (compare Examples 4, 5 and 7). The same can be said for the addition of surfactant to an all water solvent (see Examples 5 and 6). This demonstrates a convenient way to regulate molecular weight of the oligomers, which are normally viscosus oils with low glass transition temperature ($T_g$). The polymer with a weight average molecular weight of 5000 showed a $T_g$ of 15° C. Also it is noted that polydispersity in the polymers was higher for those made with batch addition of the bisulfite than for those in which delay addition was used. Example 2, which is a control run, shows that a 1:1 adduct of the vinyl acetate and bisulfite was the predominant product rather than an oligomer when the monomer and bisulfite were used in equal molar proportions.

The samples were analyzed by GPC, either in water or in tetrahydrofuran. Although this molecular weight range is below that typical for GPC, the results were in general agreement with calculated values by NMR end group analysis and by MALD/I.

The high molecular weight oligomers showed mainly a classical poly(vinyl acetate) spectrum by $^{13}C$ NMR with small additional peaks at 61, 55, and 33.5 ppm. Low molecular weight oligomers showed the same peaks, with broader, poorly resolved poly(vinyl acetate) peaks and increasing ratios of the smaller signals. The low oligomers also tended to have small to significant levels of the 1:1 addition product, sodium isethionate acetate (SIA) and in some cases products of hydrolysis, including acetate and acetaldehyde/bisulfite addition complex (ABA). Very low oligomers are frequently enriched in these materials. In most samples there were no vinyl signals. This supports the conclusion that termination is by hydrogen transfer from the bisulfite or solvent rather than by disproportionation, as radical-radical combination is rare with vinyl acetate. The 61, 55, and 33.5 ppm end group peaks were similar in area, which further supports the conclusion that the oligomers have mainly or exclusively sulfonate end groups rather than sulfite end groups, which would have much lower field resonance. This is in marked contrast to the results reported by Schmitt (supra) on reaction of allyl ethers with bisulfite.

The MALD/I mass spectrum of one of the products gave a distribution of ion peaks confirming the chemical structure: $NaO_3S$-$(VAc)_n$-H . There were no significant peaks corresponding to loss of $SO_2$ (expected for sulfite) or termination by sulfate, or by oligomer radical/oligomer radical annihilation which would produce two sulfonate end groups. A product analyzed as a sulfonate terminated vinyl acetate oligomer and having a $M_w$ of 910 and $M_n$ of 640 was tested for efficiency as a surfactant. Solutions were made at different concentrations in distilled, deionized water. Surface tensions were measured at 25° C., ±0.5° C., by the DuNouy Ring method, using Huh-Mason correction. Results are given in Table 2. Since the surface tension for sodium lauryl sulfate (SLS) at 3 weight percent equals 38 dyne/cm, these data show that the product of this invention is more effective as a surface-active agent.

TABLE 2

| Concentration, wt. % | Surface Tension @ 1 minute (dynes/cm) | Surface Tension @ 100 minutes (dynes/cm) |
| --- | --- | --- |
| 0.5 | 44.9 | 43.6 |
| 1.0 | 42.7 | 39.9 |
| 2.0 | 41.5 | 39.5 |
| 3.0 | 33.0 | 29.9 |

COMPARATIVE RUN

This run shows that an unacceptably high and broad distribution of molecular weights results when the polymerization is conducted under conditions which do not maintain a single or effectively a single phase by using neither addition of an effective level of cosolvent nor low enough vinyl acetate to bisulfite ratios to give water soluble low oligomers.

A 2 liter atmospheric kettle reactor was charged with 300 ml of water. The mixture was $N_2$ degassed and heated to 65° C. Into the reactor was delay fed through feed pumps each of the following reagents. Vinyl acetate (100 ml, 1.08 mole), sodium bisulfite (15 g, 0.096 mole, in 300 ml of water) and potassium persulfate/sodium bicarbonate (1.0 g/1.0 g in 250 ml of water). The reaction mixture was stirred for 4.5 hour, during which time all reagents were added. The crude reaction product was a mixture of emulsion and solid coagulum with a pH of 4.5. The product was readily soluble in methanol. GPC analysis showed $M_n$=9612 g/mole, $M_w$=535,046 g/mole and PD=55.7. This can be alternatively estimated as 15% <10,000, 13% 10,000–30,000, 9% 30,000–50,000, and 63% >50,000 molecular weight. Most of the product is believed not to have sulfonate end groups.

EXAMPLE 10

This example shows the use of ammonium bisulfite in place of the sodium salt. Following the procedure of Example 1, the kettle was charged with 150 ml of water and 100 ml of an aqueous solution containing 45 weight percent of ammonium bisulfite. This mixture was neutralized with acetic acid to a pH of 4.5 and degassed with nitrogen. Vinyl acetate (750 g, 8.1 mole) and potassium persulfate/sodium bicarbonate (3.0 g/2.8 g) in 250 ml of water were delay fed at the rates used in Example 1. The final product phase separated from aqueous solution on cooling and flowed nicely out of the reactor. GPC analysis showed $M_w$=17,000 g/mole, $M_n$=1,800 g/mole, and a PD of 9.4.

EXAMPLE 11

Using the general procedure of Example 1, a sulfonate-terminated oligomer was prepared by copolymerizing vinyl acetate and sodium vinyl sulfonate. The pH of the initial kettle charge of 150 ml of distilled water and 50 ml of methanol was adjusted to 4.5 with acetic acid. Vinyl acetate (500 g, 5.41 mole) and an aqueous solution of potassium persulfate/sodium bicarbonate (5.0 g/2.25 g) in 125 ml of water were delay fed as separate feeds at the rate of 0.6 ml per minute. A mixture of sodium bisulfite (60 g, 0.58 mole) in a water/methanol mixture (150/ 50) was delay fed to the reactor at a rate of 1.6 ml per minute. In a separate feed, 100 ml of 25 weight percent aqueous sodium vinyl sulfonate was delay fed at 1.6 ml per minute. The final product which contained a 9.3:87.3:3.8 molar ratio of combined sulfonate, vinyl acetate and SVS was readily soluble in water and gave a solution which formed a foam when shaken. MALD/I examination confirmed the structure: $-O_3S-[VAc]_n-[SVS]_m-H$, with $M_w$=1670, $M_n$=1300 and PD=1.28.

EXAMPLE 12

A sulfonated co-oligomer of vinyl acetate and acrylic acid (AA) was prepared following the procedure of Example 11. Vinyl acetate (400 ml, 372 g, 4.32 mole) in 50 ml of methanol, sodium bisulfite (30.0 g, 0.29 mole) in 200 ml of water and potassium persulfate/sodium bicarbonate (3.4 g/1.5 g) in 100 ml of water were delay fed through feed pumps to the reactor containing a 150/50 water/methanol mixture at the rates used in Example 11. Glacial acrylic acid (20.0 g, 0.28 mole) in 150 ml of water, neutralized with an alkali metal hydroxide to a pH of 4.7, was delay fed at 0.9 ml per minute. At the end of the reaction the solvent was vacuum stripped from the kettle mixture leaving a water solution of the sodium or potassium salt of the oligomers. MALD/I examination of the product confirmed the structure: $-O_3S-[VAc]_n-[AA]_m-H$ with $M_w$=1860, $M_n$=1520, and PD=1.22. The combining ratios were essentially stoichiometric.

EXAMPLE 13

Using essentially the same procedure as in Example 11, a sulfonate-terminated co-oligomer of vinyl acetate and diallyldimethylammonium chloride (DADMAC) was prepared. Although some high polymer was also formed, the oligomers had the structure: $-O_3S-[VAc]_n-[DADMAC]_m-H$.

EXAMPLE 14

Sulfonate-terminated oligomer of vinyl acetate was prepared following the general procedure of Example I modified to simulate a continuous process run. The kettle was charged with the water/methanol mixture, heated at 65° C. and maintained at a pH of 4.8 to 5.1. Vinyl acetate/methanol (250 ml/50 ml) was started as a delay feed at a rate of 2.77 ml per minute. Sodium bisulfite (30 g) was dissolved in 250 ml of water and 50 ml of methanol and delay fed at a rate of 1.7 ml per minute. Potassium persulfate/sodium bicarbonate (5.0 g/1.5 g) was dissolved in 150 ml of water and delay fed at a rate of 0.7 ml per minute. At the end of these additions, 30 weight percent solids were obtained and the product was slightly hazy. From this reaction mixture, 300 g of product was removed. Additional VAc (250 ml), $HSO_3$ in 200 ml of water, and persulfate were continuously added keeping the ratio of $VAc:HSO_3$ (9:1) the same without further addition of methanol. At the end of this addition, 36 weight percent solids were achieved. Oligomer was removed from the bottom of the reactor every three hours keeping at least 500 g of oligomer solution in the reactor for the entire run. This last step was repeated several times without addition of methanol until 65 weight percent solids was obtained. The final product became highly viscous and slightly hazy indicating low water solubility. GPC analysis for the mid product of the run gave $M_n$=3,100, M=1,600, and PD=1.9, and for the final product of the run, $M_w$10,000 g/mole, $M_n$2,900 g/mole, and PD=5.5.

EXAMPLE 15

The procedure of Example 14 was repeated using the same process parameters. GPC analyses were made on four cuts during the run and the results are presented in Table 3. The later cuts show the negative impact on molecular weight and polydispersity of allowing the oligomer concentration to grow too high.

TABLE 3

| Cut No. | GPC analysis | Percent solids | Comments |
|---|---|---|---|
| 1 | $M_n$ = 1,600<br>$M_w$ = 3,122<br>PD = 1.9 | 25 | Water soluble<br>Slightly hazy in<br>methanol<br>pH = 4.5–5.3 |
| 2 | $M_n$ = 1,900<br>$M_w$ = 3,400<br>PD = 1.8 | 36 | Water soluble<br>Slightly hazy in<br>methanol<br>pH = 4.3 |
| 3 | $M_n$ = 1,900<br>$M_w$ = 12,000<br>PD = 6.6 | 48 | Phase separated<br>Water soluble,<br>hazy in methanol<br>pH = 4.5 |
| 4 | $M_n$ = 2,200<br>$M_w$ = 29,000<br>PD = 13 | 59 | Phase separated<br>Hazy in water &<br>methanol<br>pH = 4.5 |

EXAMPLES 16–22

These Examples present additional runs in which sulfonate-terminated co-oligomers were prepared with vinyl acetate as the principal monomer and sodium vinyl sulfonate, acrylic acid, or diallyldimethylammonium chloride as the comonomer. Example 16 is a sulfonate-terminated homopolymer of vinyl acetate prepared for comparison with the co-oligomers. The products were a mixture of low molecular weight oligomers with some high polymer. The recipe for the runs is given in Table 4 and the nature of the products is summarized in Table 5.

TABLE 4

| Component | Parts by weight |
|---|---|
| Vinyl acetate | 100 |
| Co-monomers | 1–30 |
| Potassium persulfate | 0.1–1.5 |
| Sodium bicarbonate | 0.05–1.0 |
| Water | 10–100 |
| Alcohol | 0–50 |

The reaction conditions were 20 to 100° C., 1 to 10 hours, and a pH of 3 to 7.0.

TABLE 5

| Example | Oligomer | Molar ratio | Comments |
|---|---|---|---|
| 16 | $^-O_3$S-VAc | 10:90 | Paste oligomer |
| 17 | $^-O_3$S-VAc-SVS | 5.8:82.5:11.7 | Paste oligomer |
| 18 | $^-O_3$S-VAc-SVS | 14:77:9 | Paste oligomer |
| 19 | $^-O_3$S-VAc-AA | 5.5:77.8:16.7 | Oligomers + high polymer |
| 20 | $^-O_3$S-VAc-AA | 5.5:77.8:16.7 | Oligomers |
| 21 | $^-O_3$S-VAc-DADMAC | 9:87:4 | Oligomers + high polymer |
| 22 | $^-O_3$S-VAc-DADMAC | 8.9:82.5:8,6 | Oligomers + high polymer |

All of the polymers of Table 5 produced foam when shaken demonstrating function as a sulfur-active agent.

EXAMPLE 23

The Example shows the use of maleic anhydride as a comonomer in the formation of oligomers according to the invention. Sodium bisulfite (20.0 g, 0.192 mole) in 100 ml of water mixed with 100 ml of methanol was added to a two-liter glass kettle reactor. Following the procedure described in Example 12, vinyl acetate (500 ml, 5.4 mole) in 100 ml of methanol was delay fed at a rate of 2.77 ml per minute. Potassium persulfate/sodium bicarbonate (3.4 g/1.5 g) in 120 ml of water were delay fed through a feed pump at a rate of 0.6 ml per minute. Maleic anhydride (20.0 g, 0.203 mole) in 250 ml of methanol was neutralized with a few drops of aqueous sodium hydroxide to a pH of 4.5, and this solution was delay fed to the reactor at a rate of 1.3 ml per minute. At the end of the reaction the solvent was separated by vacuum stripping, leaving a water solution of the oligomer. The final product, which contained terminal sulfonate and copolymerized vinyl acetate and maleic anhydride in a molar ratio of 3:93:4 was readily soluble in water and gave a solution that formed a foam when shaken.

EXAMPLES 24–34

These runs illustrate the synthesis of sulfonate terminated oligomers having higher molecular weights. Molecular weight was controlled by adjusting molar ratios of bisulfite to monomer and volume ratios of water to methanol used as a cosolvent, and by operating the oligomerization on a continuous basis. In Example 24, using the procedure given in Example 14, reagents were continuously fed into a 2-liter kettle reactor which contained 100 ml each of water and methanol. With the reaction mixture at 65° C. and the pH at 4.2 to 4.8, 2000 ml of vinyl acetate in 1200 ml of methanol (MeOH) was delay fed into the reactor at a rate of 4.1 ml per minute. Sodium bisulfite (50 g) dissolved in 260 ml of water was delay fed at a rate of 0.33 ml per minute. Potassium persulfate/sodium bicarbonate (18 g/5.4 g) was dissolved in 500 ml of water and delay fed at a rate of 0.9 ml per minute. At the end of this addition, the reaction mixture contained 40 to 50 weight percent solids and was slightly hazy. Oligomer was removed from the bottom of the reactor every three hours, keeping at least a minimum amount (500 g) of oligomer solution in the reactor for the entire run. At an early stage, 300 g of product was discarded.

For Examples 25–34, the steps of Example 24 were repeated in different runs, varying vinyl acetate to sodium bisulfite molar ratios and volume ratios of water to methanol for the solvent system. Molecular weights of product oligomers were determined by GPC analysis. The products obtained were sulfonate-terminated oligomers of vinyl acetate ranging from medium to high in molecular weight. Results for each Example are given in Table 6. Where a single phase was observed for the reaction, the solution was viscous, water dispersible and methanol soluble. Where an organic phase was observed, this phase was swollen with methanol and water and viscous, while the aqueous phase had low viscosity. The reaction mixtures in all runs were, as defined for this invention, in a virtual single phase in that the vinyl acetate and bisulfite were not partitioned by phase separation. Nonetheless, polydispersities were generally better in the case of a true single phase than where two water swollen phases were observed (for example, comparing runs 26 and 30 with 27 and 28).

TABLE 6

| Example | Vac:$HSO_3$ molar ratio | Molecular weight* | Water:MeOH volume ratio | Observations |
|---|---|---|---|---|
| 24 | 32:1 | $M_n$ = 2462<br>$M_w$ = 12852<br>PD = 5.2 | 1.4:1 | Single phase |

TABLE 6-continued

| Example | Vac:HSO₃ molar ratio | Molecular weight* | Water:MeOH volume ratio | Observations |
|---|---|---|---|---|
| 25 | 38:1 | $M_n$ = 2523<br>$M_w$ = 7440<br>PD = 2.9 | 0.9:1 | Single phase |
| 26 | 47:1 | $M_n$ = 2665<br>$M_w$ = 15517<br>PD = 7.2 | 1.4:1 | 2 phase |
| 27 | 48:1 | $M_n$ = 3040<br>$M_w$ = 7665<br>PD = 2.5 | 1.3:1 | Single phase |
| 28 | 45:1 | $M_n$ = 2885<br>$M_w$ = 7779<br>PD = 2.7 | 0.9:1 | Single phase |
| 29 | 28:1 | $M_n$ = 3146<br>$M_w$ = 12122<br>PD = 3.8 | 1.5:1 | Single phase |
| 30 | 47:1 | $M_n$ = 3728<br>$M_w$ = 26815<br>PD = 7.2 | 1.5:1 | 2 phase |
| 31 | 37:1 | $M_n$ = 4096<br>$M_w$ = 22683<br>PD = 5.6 | 1.5:1 | 2 phase |
| 32 | 38:1 | $M_n$ = 4650<br>$M_w$ = 16242<br>PD = 3.5 | 1.8:1 | 2 phase |
| 33 | 56:1 | $M_n$ = 8906<br>$M_w$ = 28468<br>PD = 3.2 | 0.9:1 | 2 phase |
| 34 | 56:1 | $M_n$ = 13668<br>$M_w$ = 42114<br>PD = 3.1 | 1.6:1 | 2 phase |

*Results are for the organic phase where two phases were observed

EXAMPLES 35–45

Current Best Procedure: Synthesis of Medium to High Molecular Weight Oligomers With Low Polydispersities Following the procedure outlined in example 14, reagents were continuously fed into a 2 L kettle reactor which contained MeOH/water (150 ml/50 ml). At 65° C., pH 4.2 to 4.8, vinyl acetate/MeOH (2000 ml/1200 ml) were delay fed at a rate of 4.1 ml/min. Sodium bisulfite (8–20g) was dissolved in 65 ml of water and delay fed at a rate of 0.33 m/min. Potassium persulfate/sodium bicarbonate (20 g/6.0 g) were dissolved in 300–350 ml of water and delay fed at a rate of 0.4–0.5 ml/min. From the above reaction mixture, 300 g product was discarded at the early stage. At steady state, 40–50 wt. % solids was obtained with 5–10 wt. % unreacted VAc monomer and the product was slightly hazy. Oligomer was removed from the bottom of the reactor every 3 hours keeping at least 500 g of oligomer solution in the reactor for the entire run. The above step was repeated several times in different runs except vinyl acetate to sodium bisulfite molar ratio and MeOH to water weight ratio were varied to prepare the sulfonate terminated vinyl acetate oligomers with medium and high molecular weight. The changes and the molecular weights of the final products are listed below in Table 7.

TABLE 7

Medium and high MW Oligomer samples

| Example | Feed VAc:HSO₃ molar ratio | GPC analysis | Water:MeOH weight ratio | Comments |
|---|---|---|---|---|
| 35 | 45:1 | Mn = 2718<br>Mw = 7407<br>PD = 2.7 | 0.9:1 | One phase<br>Low viscosity |
| 36 | 32:1 | Mn = 4192<br>Mw = 13293<br>PD = 3.2 | 0.9:1 | One phase<br>low viscosity<br>MeOH soluble |
| 37 | 67:1 | ND | 0.9:1 | One phase<br>low viscosity<br>MeOH soluble |
| 38 | 65:1 | Mn = 2206<br>Mw = 11028<br>PD = 5.0 | 0.9:1 | One phase<br>Low viscosity<br>MeOH soluble |
| 39 | 70:1 | Mn = 3257<br>Mw = 17773<br>PD = 5.5 | 0.5:1 | One phase<br>Low viscosity<br>MeOH soluble |
| 40 | 70:1 | Mn = 2658<br>Mw = 13669<br>PD = 5.1 | 0.5:1 | One phase<br>Low viscosity<br>MeOH soluble |
| 41 | 60:1 | Mn = 2550<br>Mw = 8295<br>PD = 3.3 | 0.55:1 | One phase<br>Low viscosity<br>MeOH soluble |
| 42 | 40:1 | Mn = 2280<br>Mw = 5820<br>PD = 2.6 | 0.5:1 | One phase<br>Low viscosity<br>MeOH soluble |
| 43 | 30:1 | Mn = 1880<br>Mw = 5025<br>PD = 2.7 | 0.60:1 | One phase<br>Low viscosity<br>MeOH soluble |
| 44 | 67:1 | Mn = 2943<br>Mw = 9313<br>PD = 3.2 | 0.7:1 | Two phases<br>Low viscosity<br>MeOH soluble |
| 45 | 67:1 | Mn = 2906<br>Mw = 11075<br>PD = 3.8 | 0.4:1 | One phase cloudy<br>Clear after settle |

EXAMPLES 46–58

Current Best Procedure: Synthesis of Low to Medium Molecular Weight Oligomers With Low Polydispersities Following the procedure outlined in example 14, reagents were continuously fed into a 2 L kettle reactor which contained MeOH/water (50 ml/150 ml). At 65° C., pH 4.2 to 4.8, vinyl acetate/MeOH (2000 ml/1200 ml) were delay fed at a rate of 4 ml/min. Sodium bisulfite (30–115 g) was dissolved in 65–350 ml of water and delay fed at a rate of 0.33–2.5 ml/min. Potassium persulfate/sodium bicarbonate (20 g/6.0 g) were dissolved in 200–350 ml of water and delay fed at a rate of 0.33–0.9 ml/min. From the above reaction mixture, 300 g product was discarded at the early stage. At steady state, 40–50 wt. % solids was obtained with 5–10 wt %. of unreacted VAc monomer and the product was slightly hazy. Oligomer was removed from the bottom of the reactor every 2–3 hour keeping at least 500 g of oligomer solution in the reactor for the entire run. The above synthesis was repeated in different runs varying the vinyl acetate to sodium bisulfite molar ratio and MeOH to water weight ratio to prepare sulfonate terminated vinyl acetate low molecular weight oligomers. The changes and the molecular weights of the final products are listed below in Table 8.

TABLE 8

Low and Medium MW Oligomer Samples

| Example | Feed VAc: HSO₃ | GPC analysis | Viscosity (cp @ 20 wt. % in water) | Water: MeOH ratio | Comments |
|---|---|---|---|---|---|
| 46 | 14:1 | Mw = 3549<br>Mn = 1091<br>PD = 3.2 | | 3:1 | One phase<br>Low viscosity<br>water soluble |
| 47 | 23:1 | Mw = 11121<br>Mn = 1830<br>PD = 6.0 | | 2.7:1 | One phase<br>Low viscosity<br>water soluble |
| 48 | 20:1 | Mw = 3609<br>Mn = 1494<br>PD = 2.4 | | 2.7:1 | One phase<br>Low viscosity<br>water soluble |
| 49 | 10:1 | Mw = 1316<br>Mn = 852<br>PD = 1.5 | | 2.8:1 | One phase<br>Low viscosity<br>water soluble |
| 50 | 25:1 | Mw = 2730<br>Mn = 1510<br>PD = 1.8 | 12 RPM = 3.3 | 1:1 | One phase<br>Low viscosity<br>water soluble |
| 51 | 23:1 | Mw = 3015<br>Mn = 1675<br>PD = 1.8 | 12 RPM = 2.7 | 1:1 | One phase<br>Low viscosity<br>water soluble |
| Repeat-51 | 23:1 | Mw = 2513<br>Mn = 1084<br>PD = 2.3 | ND | 1:1 | One phase<br>Low viscosity<br>water soluble |
| 52 | 11.5:1 | ¹³C NMR<br>Mn = 580<br>(4% 1:1) | 12 RPM = 2.6 | 1.5:1 | One phase<br>Low viscosity<br>water soluble |
| 53 | 11.5:1 | ¹³C NMR<br>Mn = 490 | 12 RPM = 2.1 | 1.75:1 | One phase<br>Low viscosity<br>water soluble |
| 54 | 9:1 | ¹³C NMR<br>Mn = 450 | 12 RPM = 1.8 | 2:1 | One phase<br>Low viscosity<br>water soluble |
| 55 | 8:1 | ¹³C NMR<br>Mn = 365<br>(9% 1:1) | 12 RPM = 1.6 | 2:1 | One phase<br>Low viscosity<br>water soluble |
| 56 | 7:1 | Mw =<br>Mn =<br>PD = | | 2:1 | One phase<br>Low viscosity<br>water soluble |
| 57 | 5:1 | Mn = 310<br>30% 1:1 | | 2.7:1 | One phase<br>soluble |
| 58 | 4:1 | Mw =<br>Mn =<br>PD = | | 2.7:1 | One phase<br>Low viscosity<br>water soluble |
| 59 No MeOH | 7:1 | Mw =<br>Mn =<br>PD = | | only water | Two phases<br>Low viscosity<br>clear, low conv. |

COMPARATIVE RUN—59

This example was run using the general process of example 56, but with all water (no methanol cosolvent) and somewhat similar to examples 3, 5 and 6, but with high feed rates of vinyl acetate instead of starved feed. The reaction formed a separate poorly dispersed vinyl acetate rich phase which achieved only low conversion under the standard conditions.

EXAMPLE 60

This Example illustrates hydrolysis of vinyl acetate oligomers prepared as described in the foregoing Examples to produce vinyl alcohol oligomers terminated at one end by sulfonate groups. In these runs the sulfonate terminated vinyl acetate oligomers were redissolved in methanol or a methanol/water mixture (1–50 volume percent) and filtered to remove unreacted $HSO_3^-$. Hydrolysis was done by adding NaOH or nitric acid as a catalyst (0.1–10 mol percent based on the oligomer) and heating the solutions at 40 to 70° C. for 15 minutes to 8 hours. The final products were collected as white to slightly yellow fine powders or gels or as solids and air dried at room temperature, in some cases under reduced pressure. Analyses were then made by aqueous/nonaqueous GPC, MALD/I, and $^{13}C$ NMR to determine molecular weights, polydispersities, percentage of hydrolysis, and end group identity. The vinyl alcohol oligomers were washed in hot methanol with stirring for two hours, filtered and dried. GPC analysis of the methanol soluble product showed molecular weights of 600 to 1200 g/mol. Analysis by $^{13}C$ NMR indicated that very low molecular weight vinyl alcohol oligomer and sodium acetate were selectively extracted. The solid vinyl alcohol oligomers had significantly improved polydispersities. The results of these analyses for are given in Table 9.

TABLE 9

| Run 60- | $M_n$ | $M_w$ | PD | % Hydrolysis |
|---|---|---|---|---|
| 1 | 1717 | 7747 | 4.5 | NA |
| 2 | 1268 | 7352 | 5.8 | 87 |
| 3 | 1717 | 7747 | 4.5 | 96 |
| 4 | 1634 | 5491 | 3.4 | 95 |
| 5 | 2040 | 13092 | 6.4 | 97 |
| 6 | 2405 | 14092 | 5.8 | 97+ |
| 7 | 2753 | 6687 | 2.4 | 95+ |
| 8 | 2807 | 11231 | 4.0 | NA |
| 9 | 2942 | 20592 | 7.0 | 96 |
| 10 | 15657 | 3408 | 4.6 | 95+ |
| 11 | 3680 | 15492 | 4.2 | NA |
| 12 | 4375 | 14444 | 3.3 | NA |

To show the effectiveness of sulfonate-terminated vinyl alcohol oligomers for reducing the viscosity of vinyl alcohol polymers, several products and low molecular weight commercial grades of poly(vinyl alcohol) (Airvol, Air Products and Chemicals, Inc.) were selected to measure solution viscosities under various conditions. The results are given in table 10.

TABLE 10

| | | | | | T = 22° C.<br>20 wt % solution viscosity (cp) at 22° C. | | |
|---|---|---|---|---|---|---|---|
| Sample | % Hydrol. | Mn | Mw | PDI | 12 RM | 20 RPM | 60 RPM |
| Airvol 103 | 98–99 | 13,000–17,000 | 26,000–34,000 | ~2 | 615 | 579 | 477 |
| Airvol 203 | 87–89 | 15,000–20,000 | 30,000–40,000 | ~2 | 184 | 192 | 176 |
| Airvol 502 | 87–89 | 12,000–15,000 | 24,000–30,000 | ~2 | 144 | 133 | 139 |
| 60-2 | 87 | 1268 | 7352 | 5.8 | 9 | 15 | 11 |
| 60-4 | | 1634 | 5491 | 3.4 | 360* | 360* | 352* |
| 60-5 | 97 | 2040 | 13092 | 6.4 | 27 | 30 | 26 |

TABLE 10-continued

|  |  |  |  |  | T = 22° C. 20 wt % solution viscosity (cp) at 22° C. | | |
|---|---|---|---|---|---|---|---|
| Sample | % Hydrol. | Mn | Mw | PDI | 12 RM | 20 RPM | 60 RPM |
| 60-9 | 96 | 2942 | 20592 | 7 | 88 | 86 | 80 |
| 60-12 | NA | 4375 | 14444 | 3.3 | 157 | 136 | 159 |

*34 wt % solution

EXAMPLE 61

This Example illustrates formation of vinyl alcohol oligomers by acid hydrolysis. The process was carried out on wet sulfonate-terminated oligomers of vinyl acetate at 70° C. for 4 to 8 hours in methanol/water mixtures (70/30 volume ratio) at 35 weight percent solids. Nitric acid was used as a catalyst in an amount of 1.5 weight percent of the oligomer (similar results were observed with sulfuric or methanesulfonic acid). The extent of hydrolysis was gauged during the reactions by adding small aliquots of the reaction mixture to water. Loss of haziness indicated greater than 65 percent hydrolysis. At the end of the reactions, excess methanol/methyl acetate was distilled off by rotary evaporation and the final product was diluted with water to form low viscosity solutions. Data on molecular weight analysis by GPC, solution viscosities at 20% solids in water, and percent hydrolysis are given in Table 11. Runs 61–5 and 61–6 show that the reaction times for the hydrolysis process can be reduced by more than 50 percent by distilling off methanol/methyl acetate during the run while adding fresh methanol. We have also found that increasing the amount of acid catalyst to 4 weight percent of the oligomer or reducing the ratio of methanol to water will increase the rate of hydrolysis.

In Run 62–1, sodium bisulfite (8.0 g, 0.0769 mol) in 65 ml of water was delay fed at 0.33 m/min to a two liter glass kettle reactor which contained 150 ml of methanol and 50 ml of water. Vinyl acetate (500 ml, 5.4 mol) in 300 ml of methanol was delay fed at a rate of 4.1 ml/min. Potassium persulfate/sodium bicarbonate (1.7 g/1.5 g) in 120 ml of water was delay fed through a feed pump at the rate of 0.33 ml/min. Maleic anhydride (20.0 g, 0.406 mol) in 150 ml of methanol was neutralized with a few drops of aqueous sodium hydroxide to a pH of 4.5 and delay fed at 0.9 ml/min. During the entire reaction, reagents were continuously added and product was repeatedly removed from the bottom of the reactor. The final product contained terminal sulfonate groups and a 97/3 molar ratio of co-oligomerized vinyl acetate and maleic anhydride. The product was readily soluble in methanol and slightly dispersible in water to give a solution which formed a foam when shaken.

In Run 62–2, the procedure of Run 62–1 was repeated except that the concentration of maleic anhydride in the delay feed was doubled. A product was formed but conversion was low.

In Run 62–3, the procedure of Run 62–2 was repeated except that the concentration of initiator in the delay feed was doubled. The results were similar to that of Run 62–1, with the final oligomer product containing a single terminal

TABLE 11

| Run 61- (Precursor) Catalyst | GPC analysis | Time to full H₂O Solubility | Percent hydrolysis | Weight percent solids | Solution viscosity 12 RPM | Solution viscosity 20 RPM |
|---|---|---|---|---|---|---|
| 1 (Ex 28) HNO₃ | M$_n$ 1613 M$_w$ 5680 PD 3.5 | 8 hours | 95 | 16.0 | 33 cp | 34 cp |
| 2 (Ex 38) HNO₃ | M$_n$ 1856 M$_w$ 8665 PD 4.7 | 8 hours | 88.5 | 34.8 | 355 cp | 363 cp |
| 3 (Ex -38) HNO₃ | M$_n$ 1940 M$_w$ 8132 PD 4.2 | 8 hours | 85.4 | 30.0 | 128 cp | 159 cp |
| 4 (Ex 38) HNO₃ | M$_n$ 1528 M$_w$ 4884 PD 3.2 | 8 hours | 78.2 | 46.9 | 1122 cp | 1155 cp |
| 5 (Ex 37) HNO₃ | M$_n$ 1970 M$_w$ 9150* PD 4.65 | <4 hours | 82 | 45.1 | 680 cp | 660 cp |
| 6 HNO₃ | M$_n$ 2830 M$_w$ 7400* PD 2.61 | <4 hours | 81.5 | 34.8 | 114 cp | 122 cp |

*molecular weights determined using absolute molecular weight calibration instead of relative method used for other samples.

EXAMPLE 62

Example presents a series of runs illustrating the formation of co-oligomers of vinyl acetate and maleic anhydride and subsequent hydrolysis of the acetate groups in the oligomer to hydroxy groups.

sulfonate group and vinyl acetate and maleic anhydride copolymerized in a 94 to 6 molar ratio. This product was readily soluble in methanol and slightly dispersible in water to give a solution which formed a foam when shaken. Acid hydrolysis as described in Example 61 but with 3 percent nitric acid gave 95 percent hydrolysis in less than 8 hours. This hydrolyzed product was very soluble in water at a pH of 6 but the solution was slightly hazy at a pH of 1.

Sulfonate-terminated oligomers of vinyl acetate in water showed surface tensions, in dynes, in the low 40's at 0.5 weight percent concentration and in the low 30's at 3 percent. Polymerizations of vinyl acetate have been successfully conducted using these oligomers as the sole stabilizer and as a costabilizer for poly(vinyl acetate) rich emulsions. The hydrolyzed oligomer has also proven useful as a superplasticizer in concrete. Both the hydrolyzed and the unhydrolyzed oligomers have shown excellent biodegradability relative to poly(vinyl acetate) and poly(vinyl alcohol).

EXAMPLE 63

This example illustrates formation of low hydrolysis vinyl alcohol oligomers and the use of methanesulfonic acid as the catalyst. Sulfonate-terminated oligomer of vinyl acetate prepared in Example 35 was hydrolyzed at 70° C. in a methanol/water mixture (70/30 volume ratio, ~25% water by weight) at 35 weight percent solids. Methanesulfonic acid ($MeSO_3H$, 0.5 wt % on oligomer, final reaction mixture pH~1) was used as catalyst. The extent of hydrolysis was gauged during the reaction by adding small aliquots of the reaction mixture to acetone, THF, or water. During the reaction fresh MeOH was added at a rate of 1.5–3 ml per min while MeOH/methyl acetate was distilled off. After 1 hour the partially hydrolyzed oligomers were water dispersible, slightly hazy in acetone, and completely soluble in THF or MeOH. After 2 hours the product formed a white lump precipitate in acetone and haze in THF, but was completely MeOH soluble and dispersed in water with foam formation. After 3 hours the reaction mixture was completely insoluble in acetone, slightly milky in THF, slightly hazy in water, but completely MeOH soluble. After 4 hours methanol/methyl acetone was distilled off by rotary evaporation, and the final product was diluted with water to form a moderate viscosity, colorless solution at 42 wt % solids. GPC showed $M_w$=8358, $M_n$=2132, and PD=3.9. $^{13}C$ NMR analysis indicated 42 percent hydrolysis was achieved. The product appeared fully miscible with water at high (>40%, slight haze) and low (<5%, clear, foamy solution) ratios, but formed a white dispersion at intermediate ratios.

EXAMPLE 64

Evaluation of sulfonated oligomeric vinyl acetate as surfactant in acrylic emulsion.

Sulfonated oligomeric vinyl acetate was evaluated as the main surfactant component in a standard acrylic emulsion polymerization using a methyl methacrylate/butyl acrylate/methacrylic acid mixed monomer feed. The particle size was larger when compared to conventional anionic surfactants, alkylbenzenesulfonate (Rhodocal DS-10) or alpha-olefin sulfonate (Polystep A18), but the emulsions were stable as indicated by the low grit level and sedimentation. The particle size became larger and the distribution broader as the molecular weight of the oligomer increased.

| Total surfactants: | 1.4% of monomers 70/30 + Surfynol-485 |
|---|---|
| Thermal initiation (75° C.): | potassium persulfate, 2.5 hrs. |
| MMA/BA/MAA at weight ratio of 49/49/2: | |

| Surfactants (70/30 ratio) | oligoVAcSO$_3$/ Polystep B27 | oligo-VAcSO$_3$/ B-27 | Polystep A18/B27 |
|---|---|---|---|
| oligo-VAcSO$_3$ MW | 1,000 Dalton | 1,600 Dalton | |
| % solid | 46.7 | 48.1 | 46.0 |
| Sedimentation | trace | 0.1% | 0% |
| Grit (100/325) | 33/20 ppm | 36/12 ppm | 120/16 ppm |
| Dw | 123 nm | 265 nm | 92.4 nm |
| Dn | 97 nm | 137 nm | 80.2 nm |
| Dw/Dn | 1.27 | 1.93 | 1.15 |

Other embodiments, advantages, and features of our invention will be apparent to those skilled in the art from the foregoing disclosure and the following claims without departing from the spirit or scope of the invention.

What is claimed is:

1. An oligomer of a vinyl ester of an organic acid having 2 to 18 carbon atoms wherein the oligomer molecule is terminated at one end by a sulfonate group and wherein said vinyl ester is copolymerized with up to 30 mol percent of a comonomer, based on the total polymerized monomeric units in the oligomer.

2. The oligomer of claim 1 wherein said vinyl ester is vinyl acetate and said comonomer is selected from the group consisting of sodium vinylsulfonate, acrylic acid, diallyldimethylammonium chloride and maleic anhydride.

3. The oligomer of claim 1 wherein said vinyl ester is vinyl acetate.

4. The oligomer of claim 1, wherein the oligomer consists of vinyl acetate which is terminated at one end by a sulfonate group.

5. The oligomer of claim 1, having a number average molecular weight, $M_n$, in the range of 350 to 8000.

6. The oligomer of claim 3, having a number average molecular weight, $M_n$, in the range of 350 to 8000.

7. The oligomer of claim 4, having a number average molecular weight, $M_n$, in the range of 350 to 8000.

* * * * *